United States Patent [19]

Scher et al.

[11] Patent Number: 5,183,600
[45] Date of Patent: Feb. 2, 1993

[54] METHOD AND APPARATUS FOR CONTINUOUS CASTING OF POLYMERIZABLE MATERIAL

[75] Inventors: Herbert I. Scher, Pikesville; Israel S. Ungar, Randallstown; Richard R. Baehr, Jr., Annapolis, all of Md.

[73] Assignee: Nevamar Corporation, Odenton, Md.

[21] Appl. No.: 732,662

[22] Filed: Jul. 19, 1991

[51] Int. Cl.⁵ ............................................. B29C 35/10
[52] U.S. Cl. ..................................... 264/26; 264/73; 264/145; 264/148; 264/216; 264/236; 264/347; 264/331.18; 264/342 RE; 425/174.8 R; 425/224; 425/445; 425/75
[58] Field of Search .................... 264/216, 85, 22, 212, 264/26, 331.18, 166, 165, 148, 236, 73, 75, 347, 245, 342 RE, 145; 425/174.8 R, 174.8 E, 174.4, 445, 174.6, 224, 75

[56] References Cited

U.S. PATENT DOCUMENTS

| | | |
|---|---|---|
| 2,136,422 | 11/1938 | Fields . |
| 2,379,248 | 6/1945 | Muskat . |
| 2,392,578 | 1/1946 | Chenicek ............................. 264/236 |
| 2,500,728 | 3/1950 | Williams ............................. 264/22 |
| 2,579,138 | 12/1951 | Burness et al. ..................... 264/22 |
| 2,603,741 | 7/1952 | Seifried et al. . |
| 2,607,081 | 8/1952 | Taylor ................................ 264/165 |
| 2,663,908 | 12/1953 | Maier et al. . |
| 2,822,575 | 2/1958 | Imbert et al. ................ 425/174.8 R |
| 3,049,761 | 8/1962 | Yakubik . |
| 3,091,811 | 6/1963 | Hackert . |
| 3,216,849 | 11/1965 | Jacobs ................................ 264/25 |
| 3,337,674 | 8/1967 | Sonneborn et al. ................. 264/236 |
| 3,488,246 | 1/1970 | Duggins . |
| 3,519,517 | 7/1970 | Dench .......................... 425/174.8 R |
| 3,528,131 | 9/1970 | Duggins . |
| 3,529,325 | 9/1970 | Duggins . |
| 3,592,882 | 7/1971 | Morita . |
| 3,600,490 | 8/1971 | Billingsley et al. . |
| 3,663,493 | 5/1972 | Miller ................................ 264/73 |
| 3,801,407 | 4/1974 | Goldsworthy et al. . |
| 3,821,337 | 6/1974 | Bunclark et al. . |
| 3,872,197 | 3/1975 | Kato et al. . |
| 3,894,826 | 7/1975 | Kato et al. . |
| 3,906,068 | 9/1975 | Hanusa . |
| 3,923,941 | 12/1975 | Weaver . |
| 3,978,178 | 8/1976 | Oshima et al. . |
| 3,988,098 | 10/1976 | Kato et al. . |
| 4,001,368 | 1/1977 | Michizoe et al. . |
| 4,018,642 | 4/1977 | Pike et al. . |
| 4,133,861 | 1/1979 | Kato . |
| 4,186,044 | 1/1980 | Bradley et al. . |
| 4,221,253 | 9/1980 | Seiberling . |
| 4,298,413 | 11/1981 | Teare . |
| 4,314,036 | 2/1982 | Throne et al. . |
| 4,404,003 | 9/1983 | Harris . |
| 4,425,287 | 1/1984 | Hesse et al. . |
| 4,626,187 | 12/1986 | Kamada . |
| 4,710,333 | 12/1987 | Murakami et al. . |
| 4,839,125 | 6/1989 | Ida . |

FOREIGN PATENT DOCUMENTS

| | | |
|---|---|---|
| 0036819 | 9/1981 | European Pat. Off. . |
| 0246806 | 11/1987 | European Pat. Off. . |
| 3543266 | 6/1986 | Fed. Rep. of Germany . |
| 1491437 | 7/1967 | France . |
| 1497702 | 9/1967 | France . |
| 49-99163 | 11/1974 | Japan . |
| 53-140362 | 9/1978 | Japan . |
| 1366385 | 9/1974 | United Kingdom ............. 425/174.6 |

Primary Examiner—Jeffery Thurlow
Attorney, Agent, or Firm—Jones, Day, Reavis & Pogue

[57] ABSTRACT

A method and apparatus for continuous casting of polymerizable materials that shrink during polymerization includes rapidly heating a moving matrix substantially uniformly throughout its cross section by radio frequency energy to initiate polymerization and maintaining the matrix thereafter in substantial thermal isolation such that substantially adiabatic polymerization occurs.

7 Claims, 5 Drawing Sheets

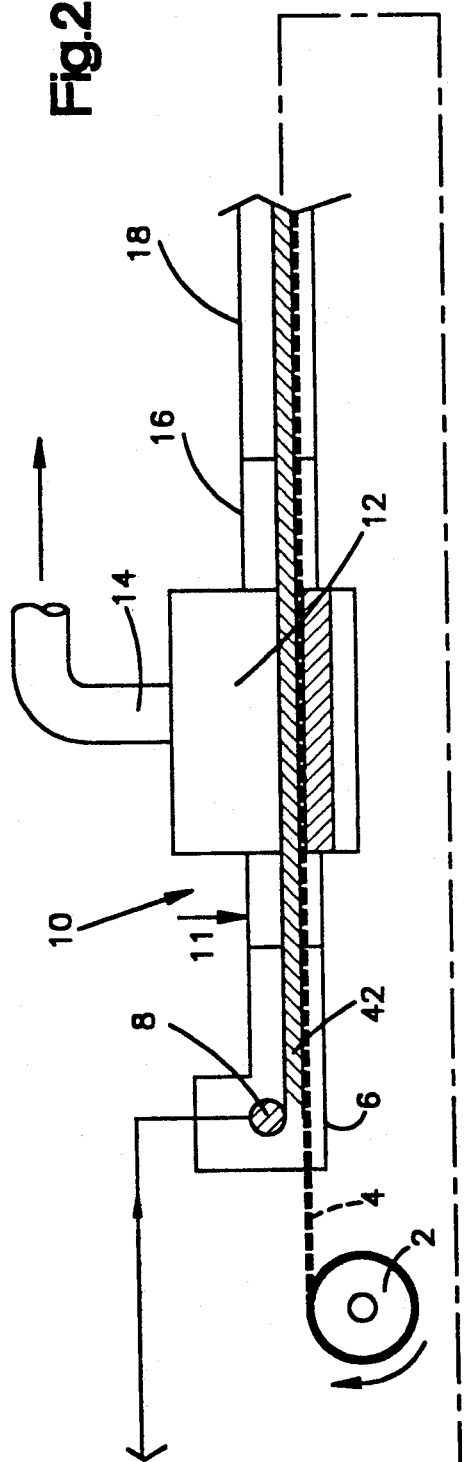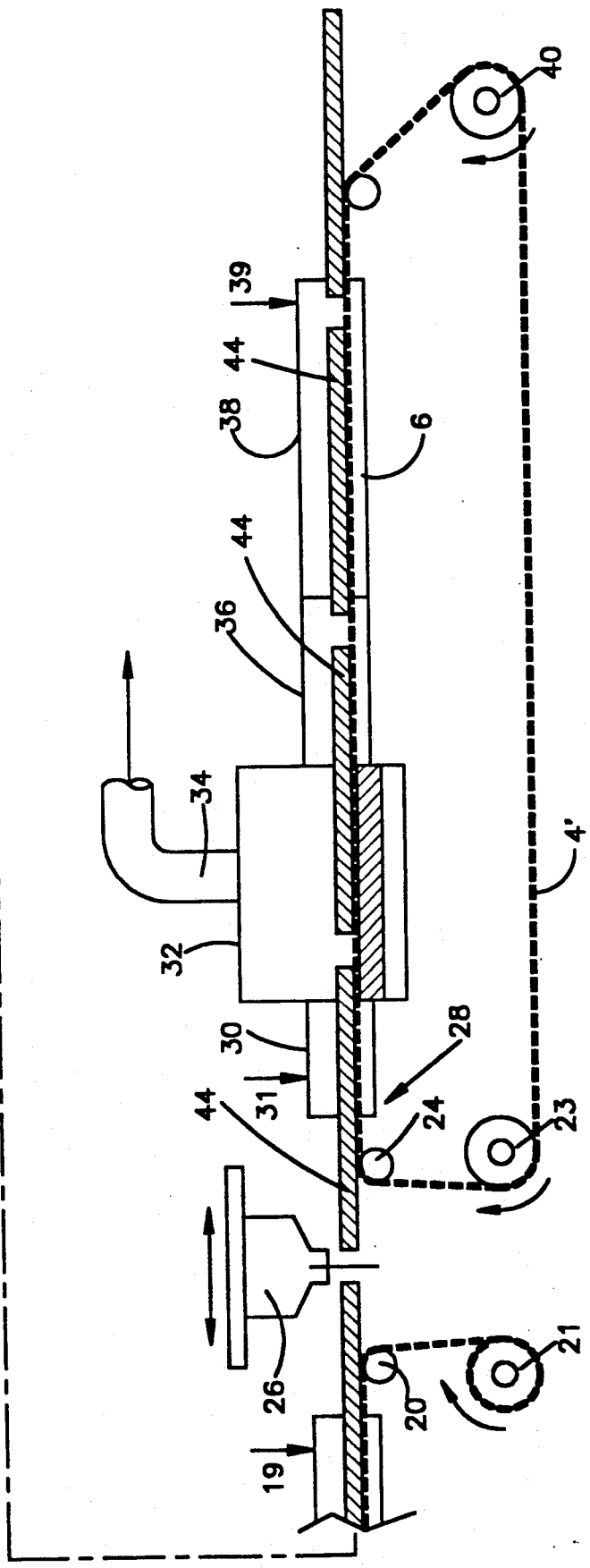

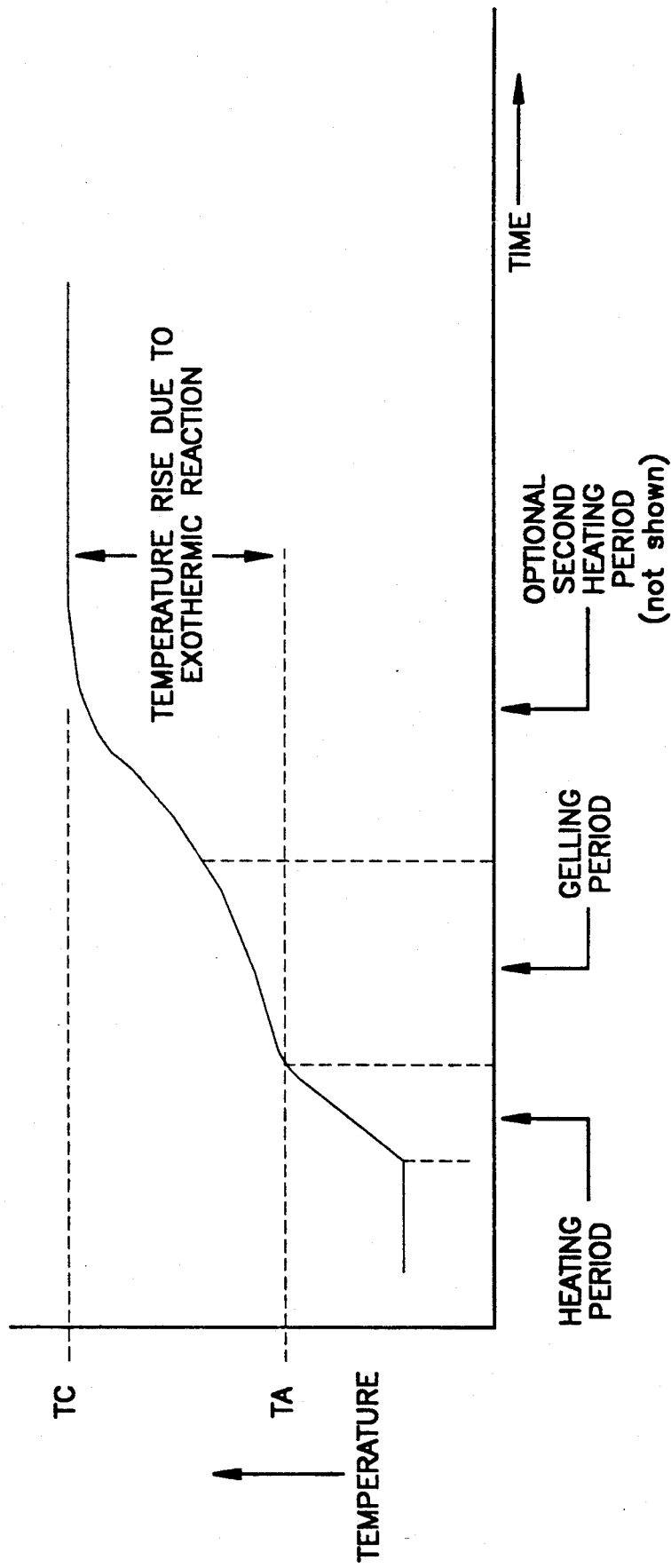

METHOD AND APPARATUS FOR CONTINUOUS CASTING OF POLYMERIZABLE MATERIAL

BACKGROUND OF THE INVENTION

I. Field of the Invention

The present invention relates to a new method and apparatus for continuously casting certain thick sheet materials sometimes used as surface overlay, but which also can be used, without underlay, such as for a stand-alone restaurant table top. More particularly, the present invention relates to an improved method and apparatus for continuously casting polymeric materials which shrink during polymerization.

II. Description of the Prior Art

Polymeric materials such as thermosetting resins, thermoplastic resins, acrylic resins and the like are commonly used as surface covering materials. Sheets of these materials are used as decorative finishing materials in new building construction and in remodeling for such applications as bathroom vanity tops, kitchen counter tops, furniture components, restaurant tables, wall paneling and other uses. The sheets can be made of plain solid colors or can be patterned to have the appearance of marble, granite or other patterns or textural decoration. The sheets often are loaded with decorative particles to provide these characteristics and the resin composition typically includes mineral fillers such as calcium carbonate or aluminum trihydrate. It is preferred that the pattern in these materials be uniformly distributed and that the final product be flat, smooth and free of warpage, bends or wrinkles. It is also preferred that a flat surface be obtained with the minimum of sanding or machining after the sheet has been cast.

The composition of these materials typically can be a single thermosetting or thermoplastic resin or a mixture of resins such as unsaturated polyesters and acrylic resin precursors. Such resins require a catalyst and/or promoter system to initiate the process of free radical polymerization. Typical resins are characterized by having a significant exothermic reaction during polymerization and a substantial increase of density during that process. Thus, a typical mixture of 65% filler and 35% resin (a "matrix") shrinks during the polymerization process so that the cured solid composition has a density about 5–8% higher than the liquid matrix. This shrinkage presents processing problems related to the present invention which are discussed below.

A variety of prior methods have been used to achieve synthetic sheet materials having a decorative pattern. One method involves a batch process. In this process, the matrix is prepared by mixing the resins with the filler and the desired decorative particles or coloring materials and with a standard quantity of catalyst. The amount of catalyst typically recommended in the prior art is one half to two percent based on the liquid resin fraction of the matrix. This matrix is then poured or pumped into a large casting mold and sealed in the mold. The mold is then subjected to sufficient heat to begin decomposition of the catalyst, which initiates polymerization of the resin. Because the polymerization is an exothermic process, the reaction contributes to the heat of the system, leading to further catalyst decomposition and an increased rate of polymerization. This follows the typical prior art approach whereby the conductive or convective heat environment applied to the matrix is warm enough to "kick off" the polymerization reaction which then sustains itself by its own heat of reaction and actually is cooled by dissipating heat back to that environment. This process continues until substantially all of the unsaturated bonds of the resin and monomer components are consumed and the resin is cured. The mold is then opened after cooling and a panel of decorative sheet material is removed. As explained below, the present invention represents a substantial departure from the thermodynamic aspects and many other aspects of this conventional approach.

Such a batch process has significance shortcomings. It is slow and inefficient, requiring a great deal of material handling equipment. Moreover, it presents significant problems with controlling the matrix uniformity in the mold, particularly where decorative particles are used in the matrix. For example, flow patterns and convection currents in the liquid matrix which may result during pumping or during the heating and early stages of polymerization can result in nonuniformity of the decorative pattern. In addition, such a batch process presents significant curing problems if the matrix is not heated with proper uniformity and, thus, does not polymerize at the same rate throughout the mold cavity. The result can be localized shrinking which may cause cracks or tears in the final cured material or may produce residual stresses.

Several prior attempts have been made to develop a continuous casting technique as an alternative to the batch process for polymeric materials which shrink upon curing. U.S. Pat. No. 3,600,490 issued to Billingsley et al, for example, teaches that if the structure cures unevenly, as it usually does, certain areas of the mass will harden and shrink unevenly, distorting the cast product. To avoid the problem of wrinkling or tearing on the surface of the matrix during shrinking, Billingsley teaches the use of a thin film and lubricant to permit relative slippage between the shrinking matrix and the belt of the conveyor. Specifically, Billingsley teaches a process whereby the matrix rests on a layer of a film which shrinks during heating at the same rate as the curing matrix. Billingsley teaches the use of oil or a similar liquid lubricant between the film layer and the conveyor belt. In this approach, the film shrinks with the matrix and the thin film does not hang up on the conveyor belts as it shrinks.

Another continuous casting approach can be found in U.S. Pat. No. 3,988,098 issued to Kato et al. Kato teaches a dual belt system which uses the force of a confined space to control the tendencies of the matrix to distort or tear itself apart during the polymerization process. The matrix is passed through a confined space defined by upper and lower belts which force the matrix to maintain a flat rectangular cross section despite the presence of internal forces brought about by localized curing which would otherwise cause the matrix to pull apart, warp or bend.

From the foregoing it can be seen that the prior art continuous casting processes involve expensive and complicated arrangements to control the curing of the polymeric material. These prior art casting methods also pose quality problems. In conventional belt casting equipment, the liquid matrix is in thermal contact with the belts and may be heated by the conduction of heat through the belts which are enclosed in an environment of heated fluid or gas. With this arrangement, the mold or belt surface can cause initiation of a rapid accelerating reaction before curing is complete. In extreme cases this can cause local boiling, or at least, irregular cure with shrinkage stresses, cracking, ripple, craze layers, etc.

If the heating were to be done on a single supporting belt (without a top belt), the bottom of the matrix layer may polymerize before the top, causing severe warp, concave upward. Also, excessive temperature differences between the matrix center and surface could cause flow patterns to develop which result in objectionable appearance of mottling or streaks. The use of typical belt systems, particularly together with convection heat, may result in the need to limit the rate of heating, resulting in a long heating time. This in turn may require a higher matrix viscosity to reduce particle settling, and longer equipment in the case of continuous casting. Problems arise because, with the longer heating time, the viscosity of the matrix will be reduced for a longer period of time before it rapidly climbs just prior to gelling. This is illustrated in FIG. 3. The lower viscosity for an extended time will permit the mineral filler to settle and also any dense particles used for decorative effect may settle, resulting in a non-homogenous sheet both in physical properties and in appearance at a cut edge.

SUMMARY OF THE INVENTION

It is an object of the present invention to provide an efficient and simple method and apparatus for continuous casting of polymeric materials which shrink upon curing. It is an object to provide a method which overcomes the problems of particle settlement and surface distortion during the curing process. It is an object to provide a method which will prevent the creation of internal stresses (and the associated problems of warp, curl and cracking.) It is a further objective to provide a method which will avoid the tendency of the shrinking matrix to detach itself due to shrinkage from the liquid matrix at the entry end of the caster.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, the invention provides a method and apparatus for continuous casting of a polymerizable material which shrinks upon curing. According to the present invention, the composition is mixed using a controlled amount of at least one catalyst. The matrix is then deposited in a controlled amount on a web which is traveling at a predetermined speed. The matrix, which is in a liquid state, is allowed to travel far enough to allow the top surface and edges to become level and smooth by the force of gravity, though a smoothing device could be used. According to the present invention, the matrix is then quickly heated at a point downstream of the depositing point substantially uniformly throughout its cross section by radio frequency energy to a temperature that initiates polymerization. It has been found in accordance with the present invention that the matrix can be made to partially polymerize quickly to a rubbery gel before significant shrinkage occurs. Thereafter, the mixture is maintained in substantial thermal isolation from its surrounding environment. As a result, the ongoing polymerization occurs in a substantially adiabatic manner. Optionally, additional heat may be supplied to the mixture to increase the reaction rate. According to the present invention, it has been found that the matrix can shrink uniformly without causing wrinkles on the bottom surface and without developing problematic stresses or deformities.

The present invention has the benefit of providing an efficient uncomplicated method of continuous casting that avoids destructive internal and external forces which tend to produce distortion. It also has the benefit of producing a cured homogeneous matrix with uniform properties and appearance. It also has the benefit of providing a sheet which shrinks uniformly throughout the sheet material, thus avoiding warpage, waviness, or other signs of irregular shrinkage during cure even though no externally applied pressure is provided. Additional advantages and benefits will be apparent to those skilled in the art upon reading this disclosure.

BRIEF DESCRIPTION OF THE DRAWINGS

FIG. 2 is a diagramatic side elevational view of one embodiment of an apparatus of the present invention.

FIG. 5 is a graph showing an embodiment of the heating sequence according to the present invention.

DETAILED DESCRIPTION OF THE PRESENT INVENTION

Figure 1:
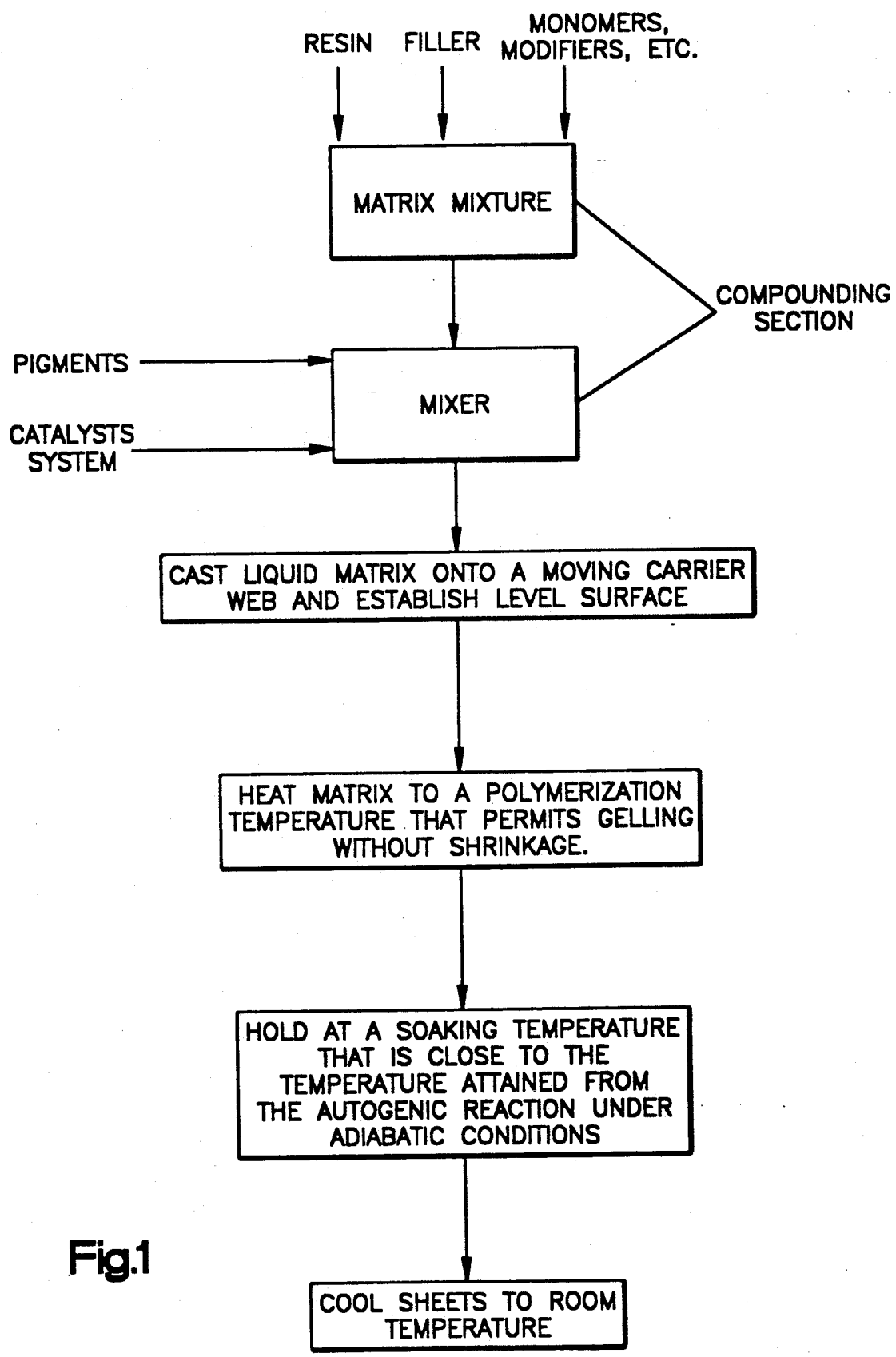
FIG. 1 is a schematic flow diagram which depicts the process steps according to one embodiment of the present invention.
Figure 3:
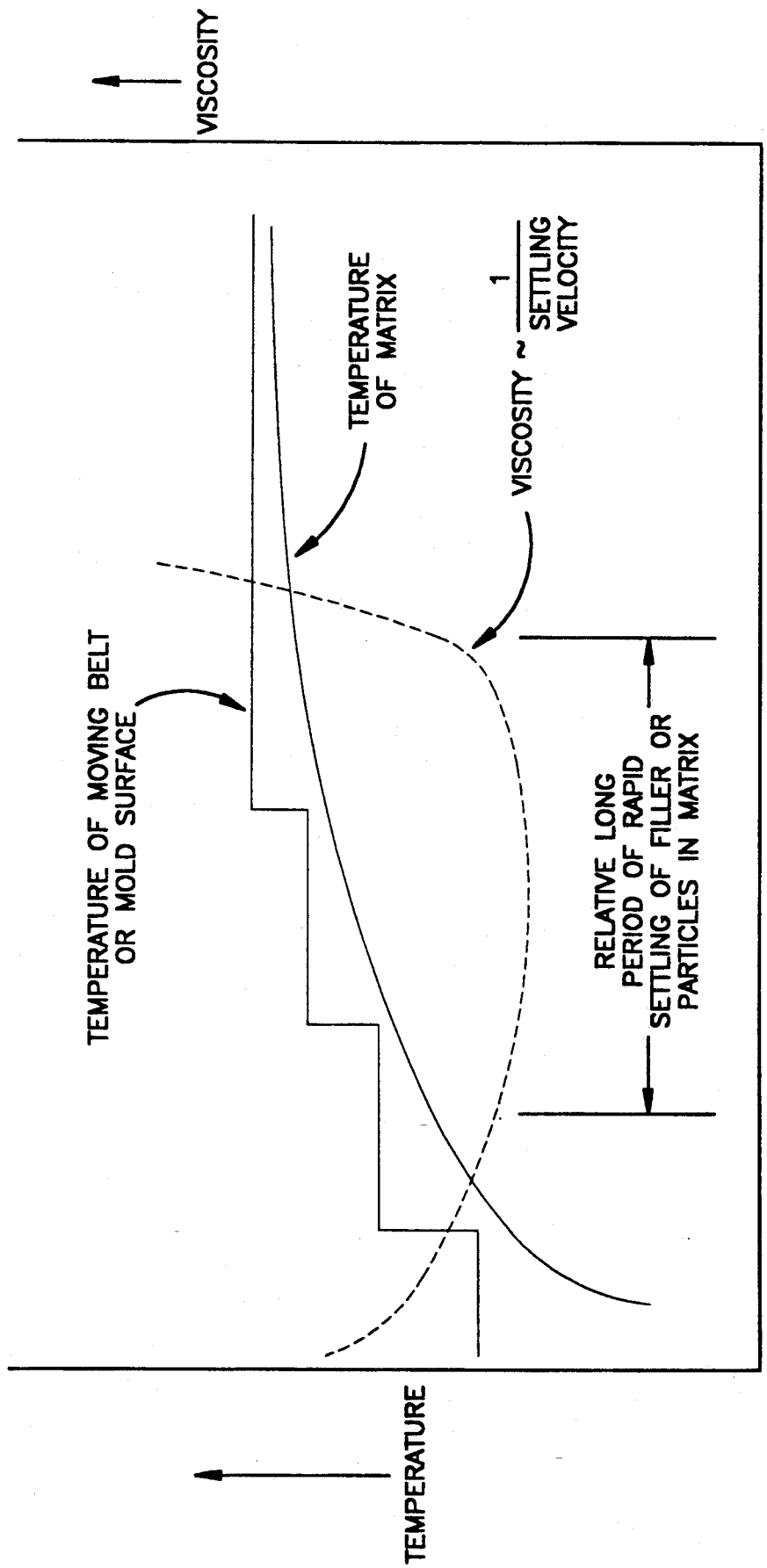
FIG. 3 is a diagram showing the relationship between the settling of the filler and the heating time of the matrix prior to the gelling in a conventional heating arrangement using conductive or convective heating.
Figure 4:
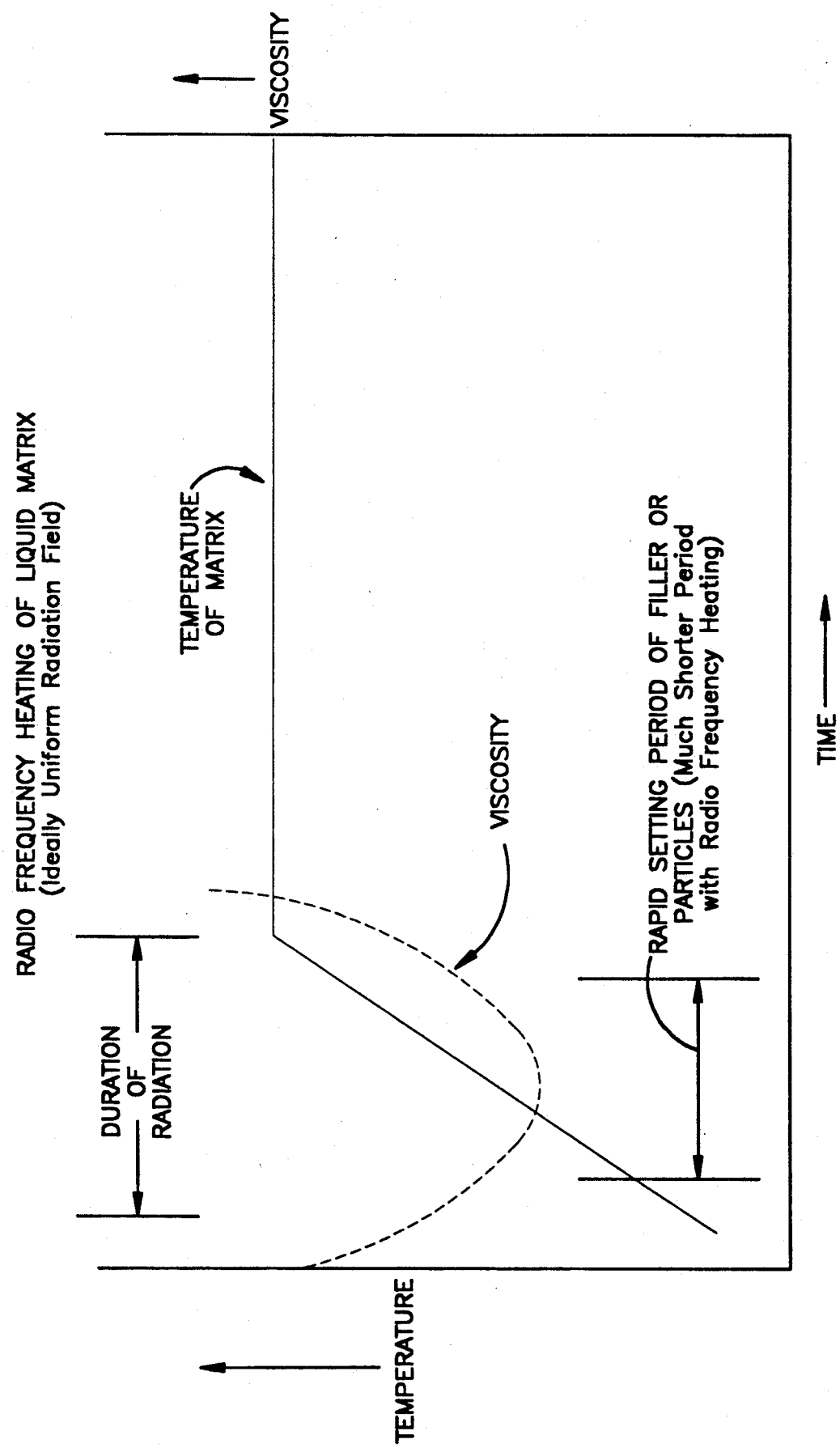
FIG. 4 is a diagram showing the improved relationship between settling of the filler and the shortened heating time made possible by the improved method of the present invention.

The process steps of the present invention are schematically illustrated in FIG. 1. As shown in FIG. 1, to begin, the matrix is prepared using a mixture of resin, filler and optional monomers, modifiers or other ingredients. The matrix is then prepared for casting with the addition of pigments and catalysts. The decorative sheet material may be made of any polymerizable material having the desired properties of heat resistance, color stability, clarity, chemical and stain resistance, and other physical properties suitable for easy machinability and fabrication in the polymerized form. The present invention is particularly well suited to materials which shrink upon curing. Such materials are discussed in greater detail below.

A catalyst system typically consisting of one or more catalyst groups is used. The catalyst should be selected to permit gelling without significant shrinkage. The specific catalyst selected and its concentration will depend on the resin used.

As explained more fully below, it has been found that, by the proper use of radio frequency energy, the matrix may be partially polymerized quickly and uniformly to the point of creating a solid rubbery material suitable for further processing in accordance with the invention before an excessive amount of shrinkage occurs. Excessive shrinkage is that amount which, in the case of the given matrix, causes the matrix to form surface wrinkles, residual stresses, warp or, in extreme cases, to tear itself apart.

Returning to FIG. 1, the liquid matrix with the added catalyst system is dispensed in controlled amounts onto a moving carrier web and moved a sufficient distance to establish a level surface levelled by other means such as a roller. In the next step of the process, depicted in FIGS. 1 and 5, the matrix is quickly and uniformly heated using radio frequency energy to a temperature where polymerization is initiated by catalyst activation. Activation temperature is the temperature at which the catalyst rapidly decomposes in resin and initiates a polymerization reaction. This is accomplished by heating the matrix by radio frequency energy, preferably in the range of 5 to 2450 megahertz, and most preferably in the range of 28-31 megahertz. Next the matrix is held in substantial thermal isolation and allowed to react under substantially adiabatic conditions.

As an optional step after gelling, the matrix may next be manipulated to isolate the gelling section from the transmission of shrinkage stresses which take place later in the process. As explained below in greater detail, this is done in two steps in the preferred embodiment. First the carrier web is peeled from the bottom of the gelled matrix. Next, the gelled matrix is physically isolated from the upstream liquid matrix. This may be done by a variety of methods such as pinch rollers or by carefully controlling the relative speeds of a first and a second conveyor or by cutting the continuous gelled sheet into predetermined lengths using a traveling saw or by providing conditions suitable for the shrinking portion of the matrix to slip on its belt or by other techniques known to those skilled in the art.

The gelled matrix may then be optionally heated further to accelerate the rate of reaction and, if this is done, is thereafter again held in substantial thermal isolation which allows it to react under substantially adiabatic conditions. This is done by holding the matrix at a soaking temperature approximately equal to the temperature obtained from the heat of reaction under adiabatic conditions. The matrix is held at this temperature at least until the shrinkage is substantially complete.

As a final option, the sheets may be held flat and cooled until well below the glass transition temperature of the matrix material. In cooling a relatively thick sheet of plastic composition, unequal shrinkage stress may occur through the cross-section due to the fact that the surface of the sheet must cool before the center. If the cooling is slightly asymmetrical from one face to the other, the sheet can warp or curl during cooling, which warp or curl can be permanent. Thus, during the cooling phase it may be advantageous to hold the sheets flat until well below the glass transition temperature.

The method of heating is by a radio frequency field. By this method, the liquid matrix can be heated very rapidly and uniformly across its cross section. Also, provided the radio frequency field is relatively uniform, the proper temperature can be raised without initiating localized premature autogenic reaction. It has been found that a short heating section, less restrictions on matrix viscosity, negligible settling of filler, and excellent heating control dynamics are obtained, thus making it possible to control the polymerization to produce a solid sheet substantially free of cracks or deformities without the need for an overhead belt to constrain the material.

One embodiment of an apparatus according to the present invention is shown in FIG. 2. This example is not meant to limit the present invention and it will be apparent to those skilled in the art that there are many alternative arrangements possible within the scope of the present invention. The casting apparatus of FIG. 2 may be divided into two general sections for purposes of discussion. The first is a section in which the matrix is cast and initially gelled. The second is a section in which the matrix is fully polymerized and cooled. These sections may be divided by a means which serves to isolate the transmission of mechanical stresses resulting from matrix shrinkage from the gelling stage of the process. As explained throughout this disclosure, the apparatus need not have two sections as shown in FIG. 2. According to the present invention, one alternative embodiment would have only a single heating and polymerization section.

Viewed from left to right, the example of the present invention shown in FIG. 2 provides an unwind roll 2 which carries a web 4 upon which the matrix is cast. In one embodiment, this web consists of a release coated roll of paper, but it could be any manner of traveling surface known to those skilled in the art such as a properly treated conveyer belt. To the right of the roll 2 there is provided a conveyor platform 6 which runs the entire length of the first section of the apparatus. The conveyor platform 6 provides a surface across which web 4 is pulled in the casting process. The conveyor platform 6 in one embodiment consists of a sequence of flat support surfaces made of insulated sheet metal or other material suitable to the environment.

At the entrance end of the conveyor platform, there is provided an apparatus for folding sharply upright the edges of the paper web 4 to form vertical edges of a predetermined height. This causes web 4 to take the form of a continuous pan. It will be obvious to those skilled in the art that other means could be used to provide appropriate edges to the web to retain the matrix. Downstream of the folding apparatus there is provided a casting head 8 for the liquid matrix. Downstream from the casting head 8 there is provided a conventional radio wave interference choke 10 which prevents the radio frequency energy from leaking out into the room. The interference choke 10 is attached to a first heating cavity 12. The heating cavity 12 is appropriately blanketed with inert gas to avoid the possibility of igniting flammable gases due to the potential electrical arcing. Heated inert gas such as nitrogen is supplied, as described below, at inlets 11 and 19 and recirculates out exhaust 14. The edge guides in the heating cavity 12 which keep the paper edges upright should be composed of a material which will not unduly heat up in or distort the RF field.

To the exit side of the heating cavity 12 there is provided an exit interference choke 16. Adjacent to the exit interference choke 16 there is provided an adiabatic soaking chamber 18. This is constructed such that the temperature of the environment surrounding the matrix is uniform on all sides and substantially matches the temperature of the matrix. In one embodiment, low density insulating material is provided beneath the moving web. Just beyond the exit end of the soaking chamber 18, a non-driven roll 20 and a rewind roll 21 are provided beneath the platform 6 in a configuration which draws the web 4 away from the gelled matrix and the inert gas supplied at inlets 11 and 19 is heated to temperatures which approximately match the temperatures of the matrix in the vicinities of the inlets, which is higher near the inlet 19 than inlet 11. By circulating the inert gas at a low velocity and exhausting it at a point between inlets 11 and 19, the matrix is blanketed along its length by a gas which approximates the temperature of the matrix. The matrix is thus maintained in substantial thermal isolation and polymerization proceeds in a substantially adiabatic manner.

The apparatus of the present invention in one embodiment would end with soaking chamber 18. In the embodiment of FIG. 2, however, additional optional items are included as described below.

In the region where the matrix and web are separated, there is provided a traveling saw 26. This arrangement for separating the sheet into individual pieces is optional. Alternate ways to control shrinkage forces include the use of pinch rolls or by advancing web 4' at a slightly slower rate than web 4 or by other techniques known to those skilled in the art.

Downstream of the traveling saw 26, there is provided a second section of conveyor platform 28 having on it web 4'. Just beyond the second section of conveyor platform 28, there is provided a second radio wave interference choke 30 adjacent an optional second heating chamber 32. Again, the heating chamber 32 is appropriately blanketed with inert gas through inlets 31 and 39 and recirculated through exhaust 34 and includes the edge guides described above to avoid edge temperature distortions. At the exit side of the second heating chamber 32 there is provided an exit interference choke 36. Adjacent to the exit interference choke 36, a second adiabatic soaking chamber 38 is provided which is constructed and operates in essentially the same manner as adiabatic soaking chamber 18. Downstream of the second soaking chamber 38, there is a cooling section.

Operation of the apparatus of the present invention, as illustrated in the embodiment of FIG. 2, proceeds as follows. Release coated paper sheets 4 is pulled from roll 2 and threaded through the equipment line to the motorized rewind roll 21. As the web 4 advances, just prior to the entrance to the casting section, the edges of the web 4 are folded sharply upright to form a moving trough with vertical edges.

A liquid matrix 42 which has been heated to a temperature at which the half life of the catalyst is such that the matrix will not polymerize in the pipe leading to the casting head 8 and which has been passed through a static mixer is pumped at a constant flow rate through the casting head 8 onto the moving web 4. The relationship among the matrix flow rate, the web velocity and the web width establishes the average thickness of the liquid matrix 42. The web 4 advances a sufficient length to allow the liquid matrix 42 to flow to a level surface. The web 4 then enters the heating cavity 12 through the interference choke 10. In that heating cavity 12, the liquid matrix is heated quickly and uniformly using radio frequency energy to a temperature selected to activate the catalyst group and to cause polymerization to a gel state without causing a strongly exothermic reaction and without causing excessive shrinkage.

Web 4 then advances through exit interference choke 16 and through adiabatic soaking chamber 18 which is maintained at the same temperature as the associated section of the matrix throughout its length as described above. In this manner, the combination of starting resin, catalyst, heating temperature and rate of advance of the web can be adjusted to provide a firm rubbery gel exiting the soaking chamber 18 which gel has not yet undergone excessive shrinkage. In one embodiment, the matrix remains in soaking chamber 18 long enough to polymerize under adiabatic conditions at least to the point where shrinkage is substantially complete.

In the embodiment of FIG. 2, the gelled matrix sheet 42 is carried on the web 4 and emerges from soaking chamber 18. There, the web 4 is peeled from the bottom of the matrix sheet 42. Then traveling saw 26, whose machine directional velocity is carefully synchronized with the web 4 velocity, makes a transverse cut through the matrix 42. This separation by cutting physically isolates the delicate and deformable portions of the gelled matrix from shrinkage stresses produced in the downstream curing step. Such a step is optional and other means can be provided as mentioned above.

In the embodiment of FIG. 2, the individual gelled sheets 44 are deposited on the moving web 4'. The web 4', now loosely supporting the gelled sheets 44, advances into the optional second heating cavity 32. Here the gelled sheet 44 optionally may be heated to a second temperature to accelerate the polymerization process which, as described below, is carried out substantially adiabatically. The polymerization process causes the temperature of the gelled matrix 44 to rapidly increase to a peak value. This peak value depends on the degree of polymerization at the time, the concentration of resin in the matrix and the heat capacity of the matrix.

The rapidly curing matrix 44, after exiting choke 36, enters the soaking chamber 38. This chamber 38 is maintained at approximately the same temperature as the temperature of the exothermic curing reaction in order to provide an adiabatic reaction environment. That is, since the surrounding gas and supporting members in the chamber 38 are held to the same temperature as the associated region of the curing matrix sheet 44, the matrix effectively is in thermal isolation from its environment. It is also preferred that supporting members 6 and webs 4 and 4' have a low heat capacity and low thermal conductivity. These conditions provide a uniform temperature profile in all directions, uniform cross-sectional shrinkage and minimization of warps, waviness and unbalanced stresses.

The present invention relies, in part, upon certain relationships in the shrinkage and polymerization properties of polymeric resin materials and their catalyst systems discovered to be advantageous in the continuous casting of polymeric materials which shrink during polymerization. Various materials were used in the work reported and the materials of the present invention are characterized as follows but are not meant to be limited by the following description. Those skilled in the art will recognize the various classes of polymeric materials and composites which can be used in accordance with the present invention.

Polyester Resin

An unsaturated polyester casting resin is prepared by a condensation reaction of dihydric alcohol and dibasic acids. The viscous reaction products are then dissolved in vinyl or acrylic monomers such as styrene, vinyl toluene or methyl methacrylate (MMA). The resins used contained about 30% styrene monomer, about 0–15% MMA monomer and have a viscosity of about 500 to 2,000 cp at 20 degrees C.

These resins typically contain a small amount of inhibitor, such as hydroquinone to prevent premature gelling during storage. They also typically contain antioxidants and UV absorbers to help control aging and UV degradation of the cured parts which cause yellowing, embrittlement and other physical deterioration.

The specific resins used are purchased from commercial resin suppliers and their exact composition is proprietary to the supplier. A wide variety of resins can be used according to the present invention. However, those found particularly well suited to be adapted for use in the present invention have the following characteristics: (1) They can be polymerized to a thermosetting state by a free radical reaction initiated by catalysts; and (2) the density of the cured resin is substantially higher than the liquid resin, i.e., the resin shrinks during curing. According to published and measured densities, the unfilled resin typically can shrink up to about 15% during polymerization of polyester and up to about 20% in the case of unfilled acrylic resin. The mixtures of resin and filler used (about 35% resin and 65% mineral filler) typically increase in density about 5-8% from the liquid matrix to the final cure. Thus, if the shrinkage occurs isotropically, i.e., the same amount in each direction, a volume shrinkage of 7% would be caused by linear shrinkage of 2.44%. Lower filler rates will have correspondingly higher shrinkage.

In the case of a mineral-filled resin matrix in which the filler has a substantial heat capacity, much of the free energy change during polymerization results in an increased temperature of the filler as well as the resin. The resins most preferably adapted for the present invention should be curable in a reasonably short period during which the final cure is conducted in an essentially thermally isolated environment without the internal heat of reaction causing enough temperature rise to cause thermal degradation of the polymer.

Aluminum Trihydrate (ATH)

Aluminum Trihydrate (ATH) is a naturally occurring mineral derived from processing of bauxite ore used in the manufacture of aluminum metal. Its molecular formula is $Al_2O_3 \cdot 3H_2O$, and in its pure, refined state, it is an almost white to yellowish granular solid. In a finely ground form, ATH has been widely used as a filler in plastics to improve fire resistance. It is most useful when ground to an average particle size below about 30 microns, but not too much below about 5 microns. The low practical limit of particle size is set by the viscosity of the resin - ATH matrix. That is, as the ATH particle size is reduced, its higher surface area results in increased viscosity of the matrix, making it less suitable in the present invention. At above about 20-50,000 cp, it becomes very difficult to process, pump and pour the matrix. With a desired mixture of 65% ATH, 35% resin, this viscosity range occurs with ATH particle size of about 10-20 microns depending on the processing conditions and the particular brand of ATH. The high practical limit of particle size would be determined by its settling rate and thus is dependent on the concentration in the resin and the gel time of the matrix. For 65% ATH, 35% resin mixtures, it is preferable in the present invention that particle size not exceed about 30 microns.

The preferred filler ratios are from about 40% to about 85%, and the more preferred ratio is from about 50% to 65%, the lower ratio, of course, being the most difficult relative to heat of reaction. The lower preferred ratio of ATH is approximately the minimum concentration that still provides good fire-hazard characteristics suitable for building applications, but lower ratios could be used if fire resistance is of no concern, or if other means are used to provide fire resistance.

"HI-POINT 90" (Witco Chemical Co.)

Methyl ethyl ketone peroxide (MEKP) is a catalyst typically used to initiate free radical reactions in polyester resins. When it is used alone in the resin, it begins to decompose at a fairly high temperature above 200° F. When used with a small amount of metal naphthenate or octoate, however, MEKP reacts at lower temperatures. Thus, polyester resin containing about 1-2% of MEKP, and about 0.04% cobalt naphthenate has been found to gel in about 30-60 minutes at 80° F., and in about only 5 minutes at 50° F. It is supplied as a 50% active mixture dissolved in dimethyl phthalate.

"USP-245" (Witco Chemical Co.)

2,5-dimethyl-2,5 bis (2-ethyl-hexanoyl peroxy hexene) is a liquid catalyst that decomposes rapidly in polyester resin at about 180° F. It is supplied as a 90% active mixture.

"PERCADOX 16" (AKZO Chemicals Inc.)

Di-(4-t-butyl-cyclohexyl)-peroxy dicarbonate is a powder that dissolves in styrene monomer, and decomposes rapidly in the resin at about 110° F. It has been found to produce a gel time of 4-8 minutes at 150° F. and thus can be used as an alternative to the combination of MEKP and cobalt naphthenate. It is supplied as an 100% active ingredient.

"TRIGONOX C" (AKZO Chemicals Inc.)

t-butyl peroxide benzoate is a liquid that decomposes rapidly in polyester at about 250° F. It is supplied as an 100% active ingredient.

EXAMPLES

Aspects of the present invention are shown by the following examples for purposes of illustration. These examples and embodiments are not meant to limit the invention in any way. Those skilled in the art will recognize that changes, additions and modifications may be made, all within the spirit and scope of the invention.

EXAMPLE 1

A matrix mixture is prepared composed of:

| | |
|---|---|
| Unsaturated Polyester | 32.2 |
| Methyl methacrylate monomer | 4.2 |
| ATH Powder | 42.6 |
| Decorative Particles | 20.9 |

The matrix is pumped at a rate of 44 #/min through a modified heat exchanger to preheat the matrix to 125° F. Once preheated, catalyst and pigment are added and mixed by use of a static mixer assembly. The composition of the catalyst solution is as follows:

| | |
|---|---|
| Percadox 16s | 15% |
| Trigonox C | 15% |
| Styrene Monomer | 70% |

The catalyst solution is metered at a rate of 0.23 #/min into the matrix stream. This provides a concentration of 0.2% Percadox 16S, 0.2% Trigonox C based on the liquid portion of the matrix mixture. The matrix is then dispensed on to the web traveling at three feet per minute with a width of 38" to produce a nominal 0.500" sheet. The matrix travels a sufficient distance to give approximately 2 minutes leveling time prior to entering an RF chamber where about 13 KW is applied to the matrix. This yields a temperature of approximately 150° F. to 160° F. which starts the polymerization. In approximately 6 minutes the material has gelled to a rubber state and the paper is removed. The continuous sheet is cut to the desired length. At this point the matrix has increased in temperature due to the exothermic polymerization reaction to approximately 210° F. but has not yet had significant change in density.

The cut matrix sheets are deposited onto a second belt which carries the matrix through a second RF chamber. Upon exiting the second chamber, the matrix will have been heated to approximately 265° F. It is then pased to a second soaking chamber where the temperature increases to approximately 280° F.–290° F. due to the heat of reaction. The fully cured sheet is then cooled evenly and slowly to room temperature. The finished sheet is observed to have a smooth bottom surface and to be substantially free of warp or other defects.

EXAMPLE 2

A sheet is prepared according to example 1 with the exception that the cutting step is omitted. That is, once the release paper web has been removed, the continuous gelled sheet is redeposited onto a continuous belt. The belt is constructed so that it does not restrict slippage between the sheet and itself. The speed of this belt preferrably is independently controllable so that it can run slightly slower than the initial web. In this manner shrinkage can be accounted for.

The continuous matrix sheet is then passed through the second RF cavity and soaking section. Once the sheet exits the oven it is then cut to the desired length and allowed to cool. The sheets are observed to have no significant difference in appearance or physical properties than those of example 1.

EXAMPLE 3

A sheet is prepared according to example 1 with the exception that a second RF cavity is not used. Once the gelled material has been cut and redeposited onto the second belt it is allowed to rise in temperature under its own heat of reaction, during which time the sheet is traveling through the second adiabatic soaking area and reaches a maximum temperature of approximately 250° F. The sheets exit the oven and are cooled to room temperature. There is no significant difference in appearance or physical properties when compared to sheets of example 1.

EXAMPLE 4 a matrix is prepared composed of:

| Unsaturated Polyester Resin | 35% |
|---|---|
| ATH | 65% | and is pumped at 20 #/min and mixed with a catalyst mixture containing:

| Percadox 16S | 15% |
|---|---|
| Styrene | 85% | so that the Percadox concentration is 0.4% based on liquid. The matrix is then dispersed onto a web moving two feet per minute with a width of 30" to produce a nominal 0.500" sheet. The liquid is then heated to initiate the polymerization and is allowed to exotherm to a temperature of approximately 230° F. to 240° F. During the exotherm period the sheet is held in the adiabatic section to isolate it from the outside environment. The paper is then removed and the sheet is cut to be deposited onto the second belt. The sheet is then passed through the second RF cavity and heated to approximately 250° F. After passing through the soaking area the sheet is allowed to cool to room temperature. The sheets are observed to be free of warp and other defects. Upon physical testing it is found that the residual styrene is higher than that of example 1. It is preferred that the residual monomer be minimized hence the use of a finishing catalyst is generally employed as in the examples if desired reduce residual monomer.

The foregoing descriptions of a preferred embodiment and alternate embodiments and examples of the invention have been presented for purposes of illustration and description. The description is not intended to be exhaustive or to limit the invention to the precise form disclosed. Obviously, many modifications and variations are possible in light of the above teaching. The embodiments and examples presented above were chosen and described in order to best explain the principles of the invention and its practical application to thereby enable others skilled in the art to best utilize the invention in various embodiments and with various modifications as are suited to the particular use contemplated.

What is claimed is:

1. A method of continuously casting a polymerizable liquid material which contains a particulate filler and which shrinks during polymerization to produce a sheet substantially free of warp, consisting essentially of:
   (a) depositing a controlled amount of a liquid mixture containing said material on a web having an upstream direction and a downstream direction and moving at a predetermined speed to provide a moving mixture of controlled thickness;
   (b) heating said mixture substantially uniformly throughout its cross section by radio frequency energy downstream of said depositing step at least to a temperature sufficient to initiate polymerization;
   (c) providing conditions which isolate shrinkage forces that occur in said mixture further downstream from said heating from transmission upstream;
   (d) maintaining said isolated mixture for a time thereafter in substantial thermal isolation and free of substantial constraining forces such that polymerization and further shrinkage occurs in a substantially adiabatic manner;
   whereby a sheet is provided free of substantial warp.

2. The method according to claim 1 wherein said radio frequency energy is in the range of about 6 to 2450 megahertz.

3. A method of continuously casting a polymerizable liquid material which contains a particulate filler and which shrinks during polymerization to produce a sheet substantially free of warp, consisting essentially of:
   (a) depositing a controlled amount of a liquid mixture containing said material on a web having an upstream direction and a downstream direction and moving at a predetermined speed to provide a moving mixture of controlled thickness;

(b) heating said mixture substantially uniformly throughout its cross section by radio frequency energy downstream of said depositing step at least to a temperature sufficient to initiate polymerization;

(c) providing conditions which isolate shrinkage forces that occur in said mixture further downstream from said heating point from transmission upstream; and (d) maintaining said isolated mixture during further shrinkage in substantial thermal isolation such that polymerization occurs in a substantially adiabatic manner and supported by a single belt, whereby a sheet is provided free of substantial warp.

4. An apparatus for continuous casting of a polymerizable material which contains a particulate filler and which shrinks upon curing, comprising:

(a) means for depositing a controlled amount of a mixture containing said material on a web having an upstream direction and a downstream direction and moving at a predetermined speed to provide a moving mixture of controlled thickness;

(b) means for heating said mixture substantially uniformly throughout its cross section by radio frequency energy downstream of said depositing step at least to a temperature sufficient to initiate polymerization;

(c) means for isolating shrinkage forces that occur in said mixture further downstream from said heating point from transmission upstream; and (d) means for maintaining said mixture thereafter in substantial thermal isolation such that substantially adiabatic polymerization and further shrinkage occurs.

5. An apparatus according to claim 4 wherein said radio frequency energy is projected in a uniform pattern whereby energy concentrations are substantially avoided.

6. An apparatus for continuous casting of a polymerizable material which contains a particulate filler and which shrinks upon curing, comprising:

(a) a web having as upstream direction and a downstream direction and suitable to move at a predetermined speed;

(b) a depositing member adjacent to said web adapted to deposit a controlled amount of a mixture containing said polymerizable material on said web;

(c) a radio frequency heater adjacent to said web and downstream of said depositing member;

(d) a thermal isolation chamber downstream of said heater and surrounding a portion of said mixture, adapted to maintain said mixture for a time free of substantial constraining forces and in substantial thermal isolation.

7. An apparatus according to claim 6 further comprising a mechanical isolation device adapted to prevent shrinkage forces which develop in said mixture downstream from said heater from transmission upstream.

* * * * *